US006986551B2

(12) United States Patent
Ohba

(10) Patent No.: US 6,986,551 B2
(45) Date of Patent: Jan. 17, 2006

(54) VEHICLE SEAT HAVING FOLDING MECHANISM

(75) Inventor: Mitsuharu Ohba, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 230 days.

(21) Appl. No.: 10/601,592

(22) Filed: Jun. 24, 2003

(65) Prior Publication Data
US 2004/0021355 A1  Feb. 5, 2004

(30) Foreign Application Priority Data
Jul. 31, 2002  (JP) ............................. 2002-222765

(51) Int. Cl.
*B60N 2/12* (2006.01)
(52) U.S. Cl. .................................... 297/341
(58) Field of Classification Search ................ 297/341, 297/378.12, 367
See application file for complete search history.

(56) References Cited

U.S. PATENT DOCUMENTS

| | | | | |
|---|---|---|---|---|
| 4,909,570 A | * | 3/1990 | Matsuhashi | ................. 297/341 |
| 6,139,104 A | * | 10/2000 | Brewer | ........................ 297/353 |
| 6,336,679 B1 | * | 1/2002 | Smuk | ..................... 297/378.12 |
| 6,474,739 B1 | * | 11/2002 | Lagerweij | ................... 297/341 |
| 6,641,218 B2 | * | 11/2003 | Ito et al. | ................ 297/378.12 |
| 6,736,461 B2 | * | 5/2004 | Blair et al. | ............ 297/378.12 |
| 6,857,702 B2 | * | 2/2005 | Becker et al. | .............. 297/341 |
| 2003/0122412 A1 | * | 7/2003 | Niimi et al. | ................ 297/341 |

FOREIGN PATENT DOCUMENTS

JP             2645583 B2     5/1997

* cited by examiner

*Primary Examiner*—Peter R. Brown
(74) *Attorney, Agent, or Firm*—Foley & Lardner LLP

(57) ABSTRACT

A vehicle seat having a folding mechanism is comprised of a locking mechanism allowing or preventing seat sliding, a wire joined to the locking mechanism, unlocking or locking the locking mechanism when pulled or at rest respectively, a base member disposed above the locking mechanism, a first actuating member, rotatably supported on the base member, a second actuating member, rotatably supported on the base member coaxially with the first actuating member and joined to another end of the wire, allowing the wire to be at rest when in a forward position and pulling the wire when rotated by the first actuating member to a backward position when the first actuating member is rotated backward, an upper member rotatably supported on the base member, and an engaging projection member which is contactable with the first actuating member to rotate the first actuating member backward or forward.

19 Claims, 14 Drawing Sheets

INITIAL POSITION

W/IN LEVER-CONTACT POSITION

STOP POSITION
(VEHICLE ENTER-EXIT)

FULLY COLLAPSED POSITION
(TABLE)

SEAT BACK RAISING-STAGE 1

SEAT BACK RAISING-STAGE 2

US 6,986,551 B2

VEHICLE SEAT HAVING FOLDING MECHANISM

BACKGROUND OF THE INVENTION

The present invention relates to a vehicle seat having a folding mechanism, in particular, it relates to a vehicle seat having a folding mechanism which enables a second seat of a minivan to be slidable forward and backward relative to a vehicle and enables the second seat to be used as a table.

A second seat of a minivan according to the related art is constructed such that by folding the seat back forward to a predetermined inclination angle, the second seat advances forward on the floor of the vehicle to facilitate getting in and out of the rear seat via the rear door. There are also second seats that are usable as a table by further folding the seat back from the predetermined forward inclination angle into the seat cushion.

A second seat in this instance comprises a seat reclining apparatus and a seat-slide apparatus, which in combination give a so-called "walk-in" capability. This sort of capability facilitates entry-exit to or from the third seat by propelling the second seat forward when the seat back thereof is folded forward to create more clearance for a passenger.

The second seat is mounted on the seat-slide apparatus to be slidable thereon backward and forward relative to the vehicle. The second seat is under constant urging of a spring to move forward, but is fixable at any desired position along the seat-slide apparatus in a state herein called "seat lock" by means of a locking mechanism of the seat-slide apparatus. With reference to a seat reclining apparatus Sa in FIG. 14, by folding the seat back forward, an arm plate 2 rotates in the direction of the arrow and a pin 5, which is formed integrally on arm plate 2, contacts with an end of a walk-in lever 6 to rotate walk-in lever 6 counter-clockwise according to FIG. 14, causing a wire end 7 of a wire 8 to be pulled upward toward seat reclining apparatus Sa. Wire 8 is connected to the locking mechanism of the seat-slide apparatus, and while the locking mechanism is urged to be locked to prevent seat sliding, pulling of wire 8 causes the locking mechanism to unlock, letting the seat be slidable.

SUMMARY OF THE INVENTION

However, when releasing this kind of second seat according to the related art from a state of seat lock, as wire 8 is maintained in a pulled state due to walk-in lever 6, the locking mechanism of the seat-slide apparatus is maintained in an unlocked state, so the second seat is moved completely all the way forward on the seat-slide apparatus by the spring which constantly urges the second seat to move toward the front of the vehicle, in which position the locking mechanism remains unlocked. Therefore, when having advanced the second seat all the way forward for use as a table, it is held there only by virtue of the urging force of a spring, and the second seat is therefore extremely unstable. Improvement in the usability of such a second seat as a table is desirable, and even more so with those second seats not having a spring.

It is therefore an object of the present invention to provide a vehicle seat having a folding mechanism where seat lock is possible even when the seat is moved all the way forward in the vehicle to enable a seat back thereof to be used stably as a table.

An aspect of the present invention resides in a vehicle seat having a folding mechanism, the vehicle seat being both fixable and slidable forward and backward relative to the vehicle, the vehicle-seat comprising locking means for allowing or preventing seat sliding when unlocked or locked respectively, a wire joined to the locking means at one end thereof, the wire unlocking or locking the locking means when pulled or at rest respectively, a base member disposed above the locking means, a first actuating member, supported to be rotatable in a first direction and a second direction on the base member, a second actuating member, rotatably supported on the base member coaxially with the first actuating member and joined to another end of the wire, the second actuating member allowing the wire to be at rest when in a first position and pulling the wire when rotated by the first actuating member to be in a second position when the first actuating member is rotated in the second direction, first urging means for urging the first actuating member in the second direction, disposed between the first actuating member and the second actuating member, second urging means for urging the second actuating member in the first direction, disposed between the base member and the second actuating member, an upper member rotatably supported on the base member, and an engaging projection member rotating integrally with the upper member, the engaging projection member contactable with the first actuating member to rotate the first actuating member in the first direction or the second direction.

Another aspect of the present invention resides in a vehicle seat having a folding mechanism, the vehicle seat being both fixable and slidable forward and backward relative to the vehicle, the vehicle seat comprising, locking means for allowing or preventing seat sliding when unlocked or locked respectively, a wire joined to the locking means at one end thereof, the wire unlocking or locking the locking means when pulled or at rest respectively, a base member disposed above the locking means, bottom actuating means for pulling the wire, rotatably supported on the base member and joined to another end of the wire, the bottom actuating means allowing the wire to be at rest when in a first position and pulling the wire when in a second position, top actuating means for rotating the bottom actuating means from the first position to the second position, rotatably supported on the base member coaxially with the bottom actuating means, an upper member rotatably supported on the base member, and an engaging projection member rotating integrally with the upper member, the engaging projection member being in one of a first area, a second area, a third area, and a fourth area, in the first area, the engaging projection member not contacting the top actuating means and the upper member being in a backward folding direction where it is possible to rotate the top actuating means in a second direction when the upper member is rotated in a forward folding direction, in the second area, the engaging projection member pushing and rotating the top actuating means in the second direction and thereby causing the bottom actuating means to be in the second position, in the third area, the engaging projection member not contacting the top actuating means and the upper member being in a forward folding direction where it is possible to rotate the top actuating means in a first direction when the upper member is rotated in a backward folding direction, in the fourth area, the engaging projection member pushing and rotating the top actuating means in the first direction.

A further aspect of the present invention resides in a vehicle seat comprising a seat cushion, a seat back swingably connected above the seat cushion, a seat slide mechanism disposed between the seat cushion and a floor of a vehicle, the seat slide mechanism being capable of allowing the seat cushion to slide in the fore-and-aft direction of the vehicle, and a lock mechanism putting the seat slide mechanism in a release state of allowing sliding movement of the seat cushion when the seat back is folded forward at a first angle within a first angle range, the lock mechanism putting the seat slide mechanism in a lock state of prohibiting the-sliding movement of the seat cushion when the seat back is folded forward at a second angle within a second angle range greater than the first angle range relative to the seat back before folding forward.

The other objects and features of this invention will become understood from the following description with reference to the accompanying drawings.

DETAILED DESCRIPTION OF THE INVENTION

Figure 1:
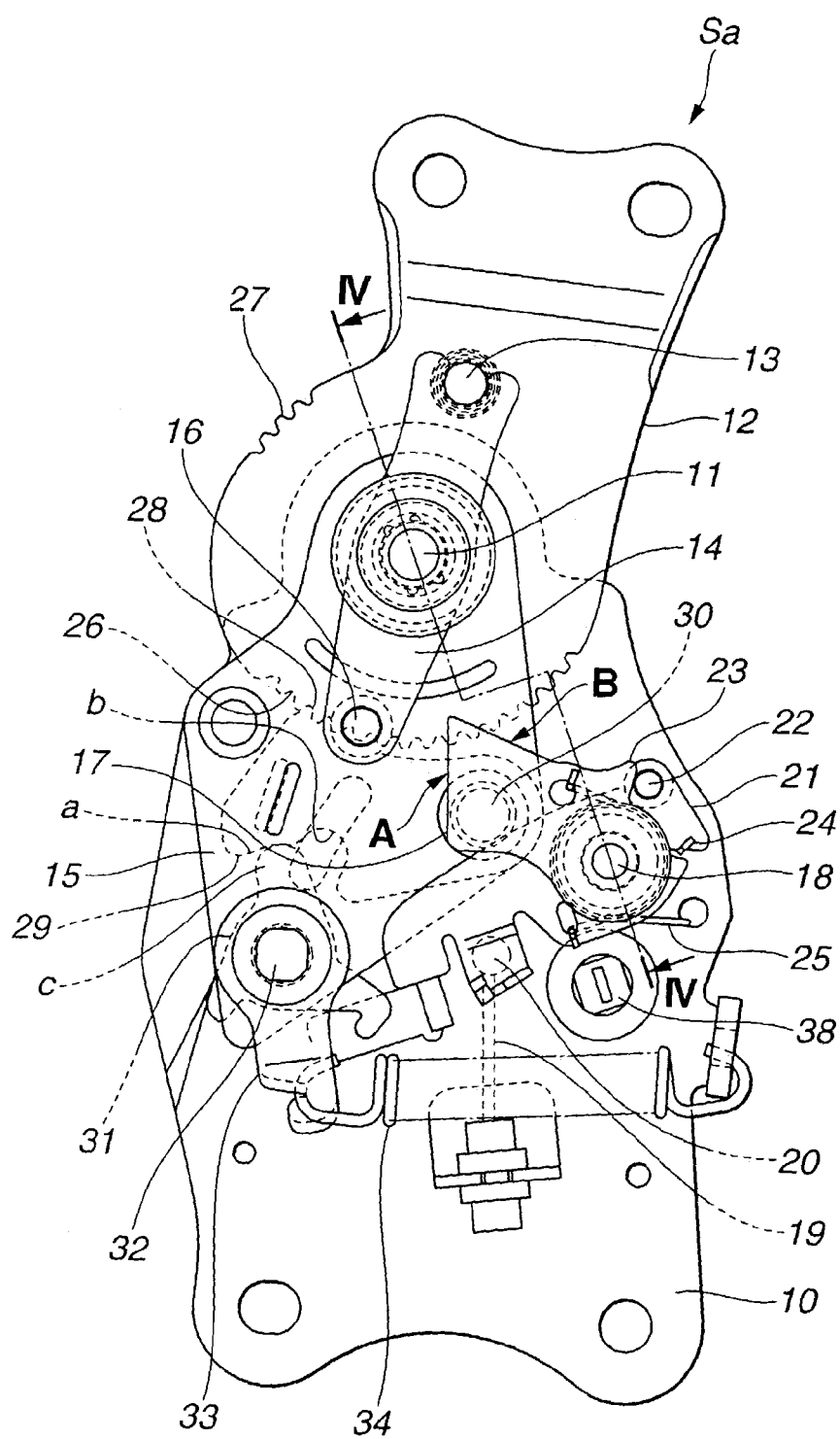
FIG. 1 is a front view showing a seat reclining apparatus according to a first embodiment of the present invention.

Referring to FIGS. 1 through 12, there is discussed a first embodiment of a vehicle seat having a folding mechanism in accordance with the present invention.

A vehicle seat according to the present invention is a second seat, the seat comprising a folding "walk-in" mechanism. A folding mechanism according to the present invention comprises a seat reclining apparatus Sa and a seat-slide apparatus S. Seat reclining apparatus Sa according to the present invention is first herein explained with reference to FIGS. 1 through 5.

As shown in FIGS. 1 through 4, seat reclining apparatus Sa comprises a base plate 10 which is fixed to a seat cushion Sc of the seat, and a holder plate 15. Base plate 10 comprises a center shaft 11 which supports an arm plate 12 to be freely rotatable thereon, arm plate 12 being fixed to a seat back Sb of the seat. Arm plate 12 comprises a joining pin 13 which is formed at a right angle thereto. A walk-in plate 14 is axially supported to be rotatable on center shaft 11 which projects through holder plate 15. One end of walk-in plate 14 engages with joining pin 13 so that walk-in plate 14 rotates integrally with arm plate 12.

Base plate 10 further comprises a shaft 18 which axially supports a first lever 17 to be freely rotatable. Walk-in plate 14 comprises a pin 16, and first lever 17 comprises a surface A and a surface B which lie within an arc formed by a rotation of pin 16, formed respectively on the front and back of first lever 17 relative to the vehicle. A second lever 21 is also axially supported on shaft 18 to be freely rotatable between base plate 10 and first lever 17 so that second lever 21 and first lever 17 are respectively on the bottom and top with respect to base plate 10. Second lever 21 is connected to a wire 19 through a wire end 20, wire 19 joining to seat-slide apparatus S. Second lever 21 comprises a stopper pin 22, and first lever 17 comprises a nub portion 23 which projects therefrom to contact with stopper pin 22.

Figure 3:
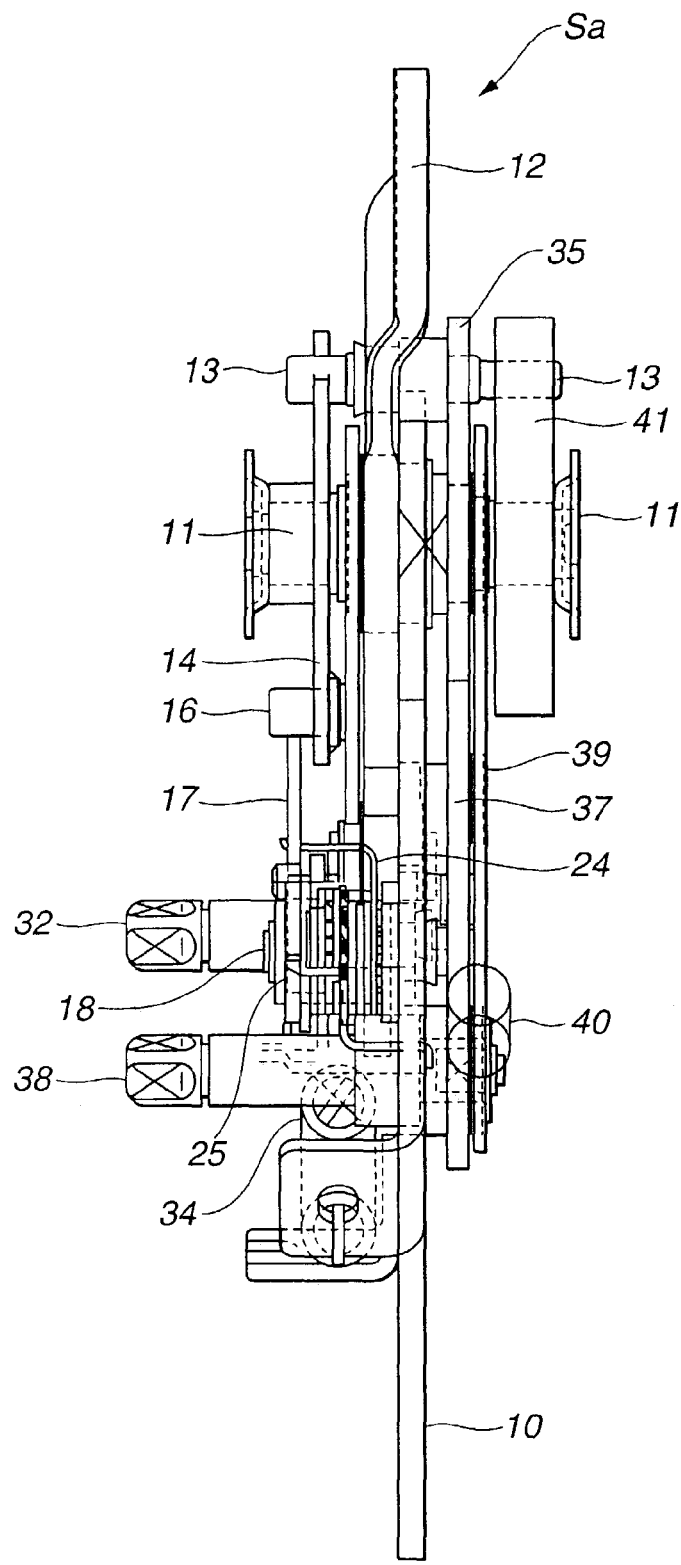
FIG. 3 is a right view showing the seat reclining apparatus.
Figure 4:
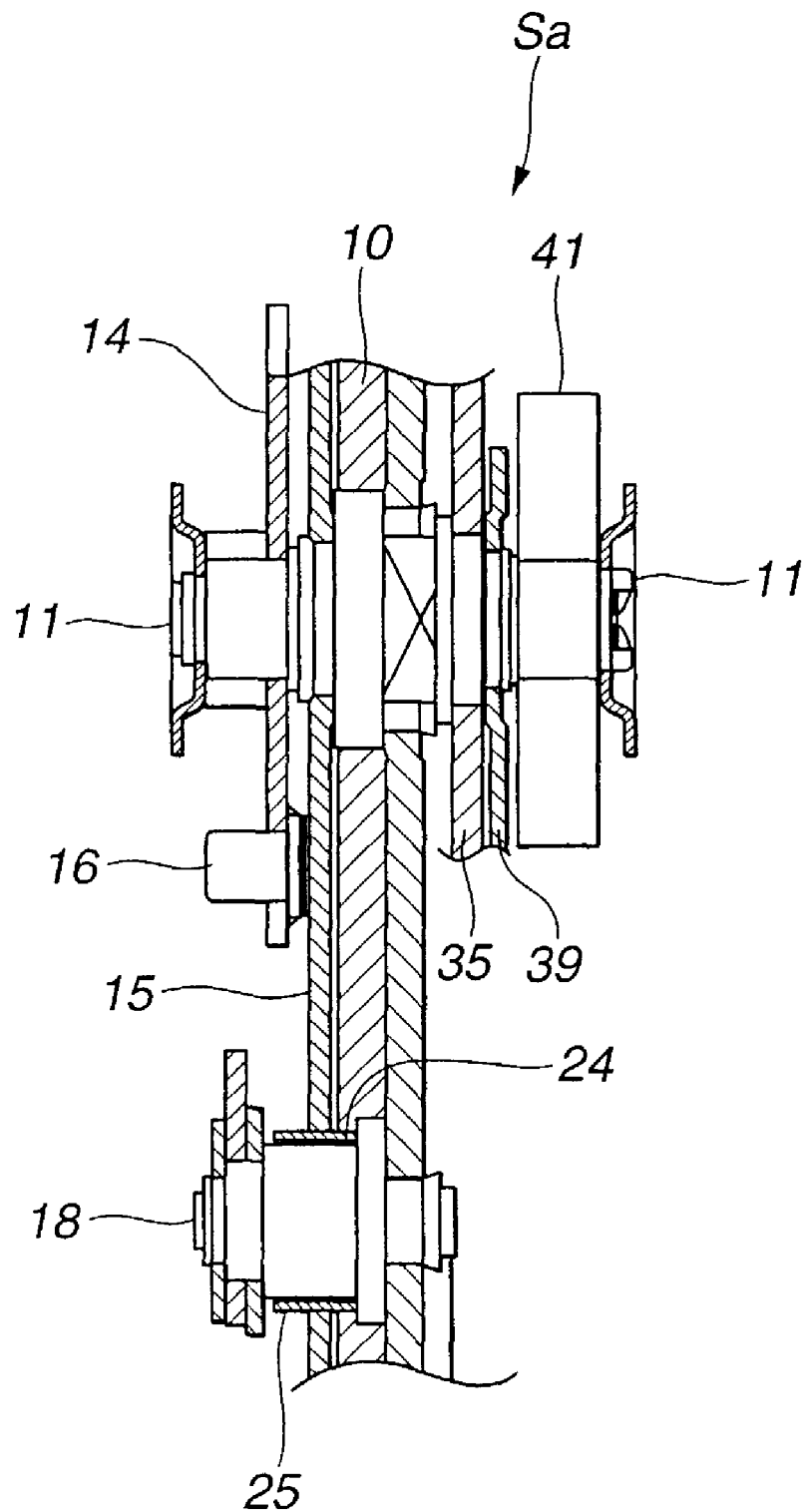
FIG. 4 is a cross-sectional view of the seat reclining apparatus along the line IV—IV of FIG. 1.

As shown in FIGS. 1 and 3, two springs are wound about shaft 18 between first lever 17 and second lever 21. A first spring 24 is resiliently attached between first lever 17 and second lever 21, and urges first lever 17 to rotate clockwise according to FIG. 1 backward toward the back of seat back Sb so that nub portion 23 contacts with stopper pin 22, and a second spring 25 is resiliently attached between second lever 21 and base plate 10, and urges second lever 21 to rotate counter-clockwise according to FIG. 1 forward toward the front of seat back Sb.

Further, a lower portion of arm plate 12 is formed as an arc portion of a predetermined radius about center shaft 11. A first tooth portion 26 and a second tooth portion 27 are formed on a periphery of the arc portion for adjusting reclining, separated by an intervening toothless portion. A reclining lock mechanism which engages and disengages with first tooth portion 26 and second tooth portion 27 is disposed between base plate 10 and first holder plate 15. Second tooth portion 27 is used to fix arm plate 12 to base plate 10 when the second seat is being used as a table.

The reclining lock mechanism comprises a shaft 30 which is supported by first holder plate 15 and base plate 10, and a tooth member 29 which is axially supported on shaft 30 to be swingable. Tooth member 29 comprises a tooth portion 28 at an upper portion of an end thereof away from shaft 30, tooth portion 28 engaging and disengaging with first tooth portion 26 and second tooth portion 27. The reclining lock mechanism further comprises a shaft 32 which is supported on first holder plate 15 and base plate 10 and a cam 31 which is axially supported to be rotatable thereon. Cam 31 serves to swing tooth member 29. A lever 33 is joined to shaft 32 to rotate integrally therewith, and a return spring 34 is resiliently attached to lever 33 between lever 33 and base plate 10. Although not shown in FIG. 3, a reclining lever or knob would be attached to shaft 32 with which to rotate cam 31.

Figure 2:
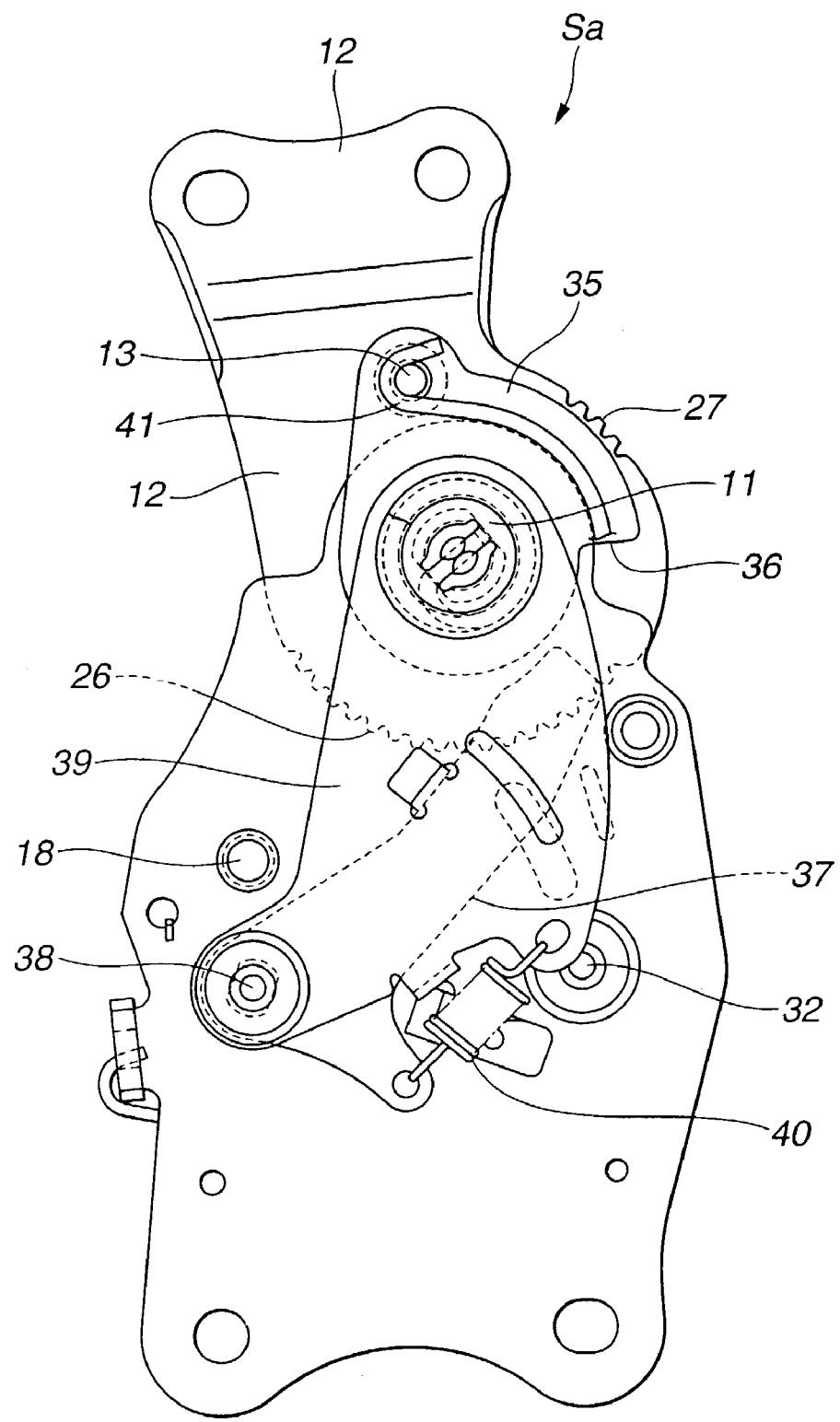
FIG. 2 is a back view showing the seat reclining apparatus.

On a back side of base plate 10, as shown in FIG. 2, joining pin 13 is formed to project from the back surface of arm plate 12, joining arm plate 12 to a stopper disk 35 which is axially supported on center shaft 11, so that stopper disk 35 rotates integrally with arm plate 12. Stopper disk 35 comprises a stopper surface 36 which is crank-shaped to be contacted with an upper end of a stopper lever 37 which is L-shaped, stopper lever 37 being axially supported at another end thereof. A spring 40 is resiliently attached between stopper lever 37 and a second holder plate 39 to constantly urge stopper lever 37 in a direction that an edge of the upper end of stopper lever 37 is in sliding contact with stopper disk 35 to be contactable with stopper portion 36 of the arc portion. Further, a shaft 38 is supported to be freely rotatable on base plate 10, and although not shown in FIG. 3, a table lever or knob for folding the seat into a table is attached thereto. Also, a spiral spring is attached, with an outer end portion thereof latched to joining pin 13 and an inner end portion thereof latched to center shaft 11, so that arm plate 12 is constantly urged to rotate in a direction to incline forward.

Thus, operation of a reclining lever or knob rotates cam 31, causing a lobe portion c of cam 31 shown in FIG. 1 to move reciprocatingly between a sliding contact portion a and a depression portion b of tooth member 29. This action causes tooth member 29 to move reciprocatingly in an up or down direction about shaft 30, and it is possible to engage and disengage tooth portion 28 with first tooth portion 26 or second tooth portion 27. That is, movement of lobe portion c of cam 31 into depression portion b of tooth member 29 causes tooth member 29 to swing counter-clockwise according to FIG. 1 about shaft 30, whereby tooth portion 28 disengages from first tooth portion 26, and opposite to this, movement of lobe portion c of cam 31 to sliding contact portion a of tooth member 29 causes tooth member 29 to swing clockwise according to FIG. 1 about shaft 30, whereby tooth portion 28 engages with either first tooth portion 26 or second tooth portion 27.

Figure 12:
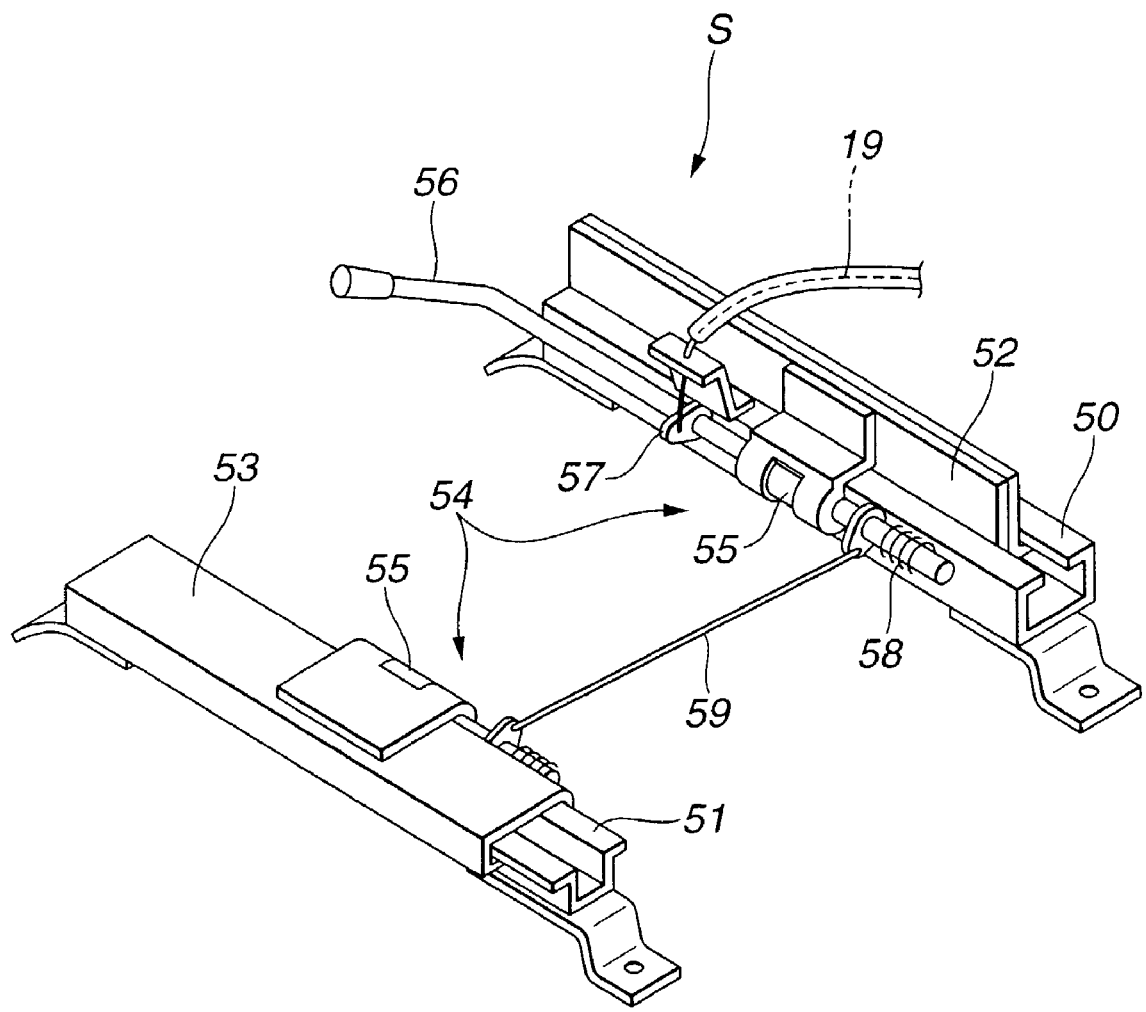
FIG. 12 is a perspective view showing a seat-slide apparatus of the present invention.

Referring to FIG. 12, seat-slide apparatus S comprises lower rails 50 and 51 which are fixed to the vehicle floor, and upper rails 52 and 53 which are engaged with lower rails 50 and 51 to be movable forward and backward relative to the vehicle. Generally, upper rails 52 and 53 are constantly under urging of a spring (not shown) to move forward. Lock mechanism portions 54 and 54 are fixed to upper rails 52 and 53, and comprise lock catches 55 and 55. Lower rails 50 and 51 comprise lock holes (not shown) to be engaged by lock catches 55 and 55. Seat-slide apparatus S is fixable by lock catches 55 and 55 engaging the lock holes of lower rails 50 and 51 at a position where upper rails 52 and 53 have been moved to, entering a state of seat lock.

Seat-slide apparatus S also comprises a lever 56 for rotating lock catches 55 and 55. Lever 56 integrally comprises a branch lever portion 57 to which another end of wire 19 is joined. Lever 56 is axially supported by one of lock mechanism portions 54 and 54 to be rotatable. Further, a joining rod 59 is provided so that both of lock mechanism portions 54 and 54 are moved synchronously by action of lever 56 on only one of lock mechanism portions 54 and 54.

Lock catches 55 and 55 are constantly urged to rotate to engage with lock holes in lower rails 50 and 51 by a return spring 58. Thus, when wire 19 is pulled upward toward seat reclining apparatus Sa, lever 56 of seat-slide apparatus S is axially rotated against the force of return spring 58 by wire 19 pulling on branch lever portion 57, and lock catches 55 and 55 come out of lock holes in lower rails 50 and 51, releasing the state of seat lock.

Figure 6:
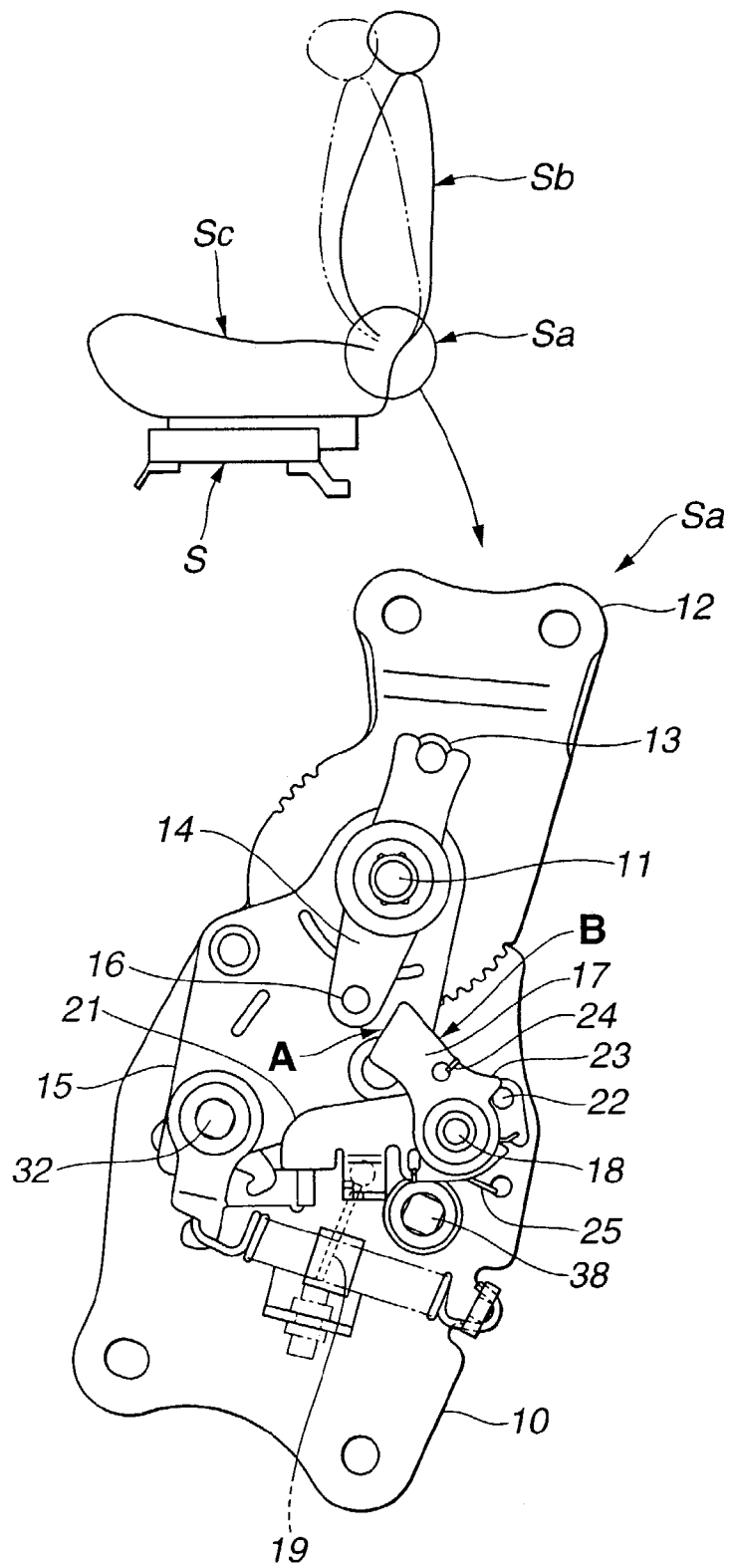
FIG. 6 is a schematic view of a side of a vehicle seat showing an initial position of the seat reclining apparatus and an enlarged portion view thereof.

Operation of the folding mechanism is herein explained. By operating the reclining lever or knob and releasing the state of seat lock, seat back Sb begins inclining in a direction to fold forward, however, at an initial position as shown in FIG. 6 where inclining has begun, pin 16 of walk-in plate 14, which rotates integrally with arm plate 12, is still at a distance away from surface A of first lever 17. In this initial position, wire 19 remains pulled downward toward seat-slide apparatus S by the spring force of lock mechanism portions 54 and 54 of seat-slide apparatus S, and second lever 21 remains rotated counter-clockwise according to FIG. 6 about shaft 18.

Figure 7:
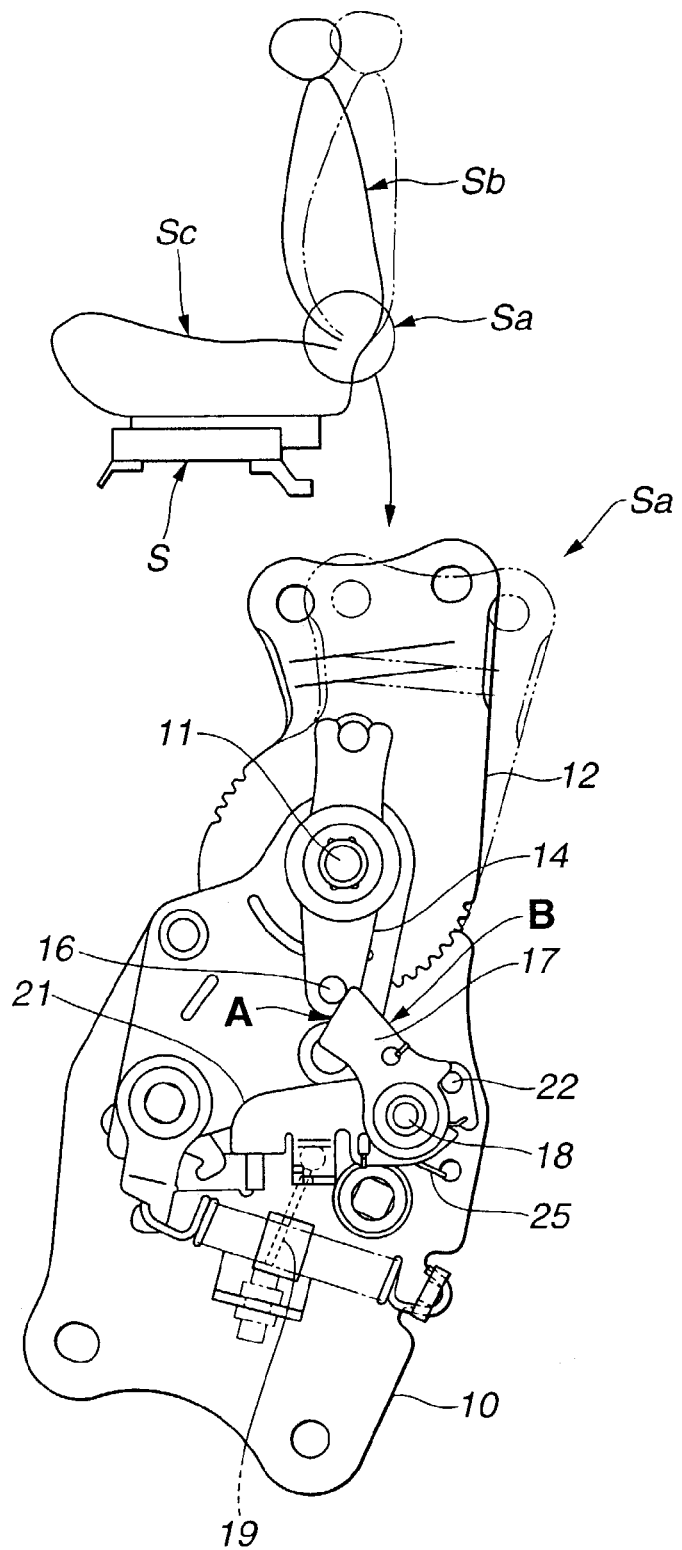
FIG. 7 is a schematic view of a left side of the vehicle seat showing a walk-in operation of the seat reclining apparatus and an enlarged portion view thereof.

Folding seat back Sb forward causes arm plate 12 to incline forward. This results in walk-in plate 14, which is integrally joined with arm plate 12, to rotate, and as shown in FIG. 7, seat back Sb can be folded to an angle within a predetermined range of angles such that pin 16 contacts with surface A of first lever 17 to rotate first lever 17 clockwise according to FIG. 7 about shaft 18, clockwise being a direction backward relative to the vehicle herein.

Figure 8:
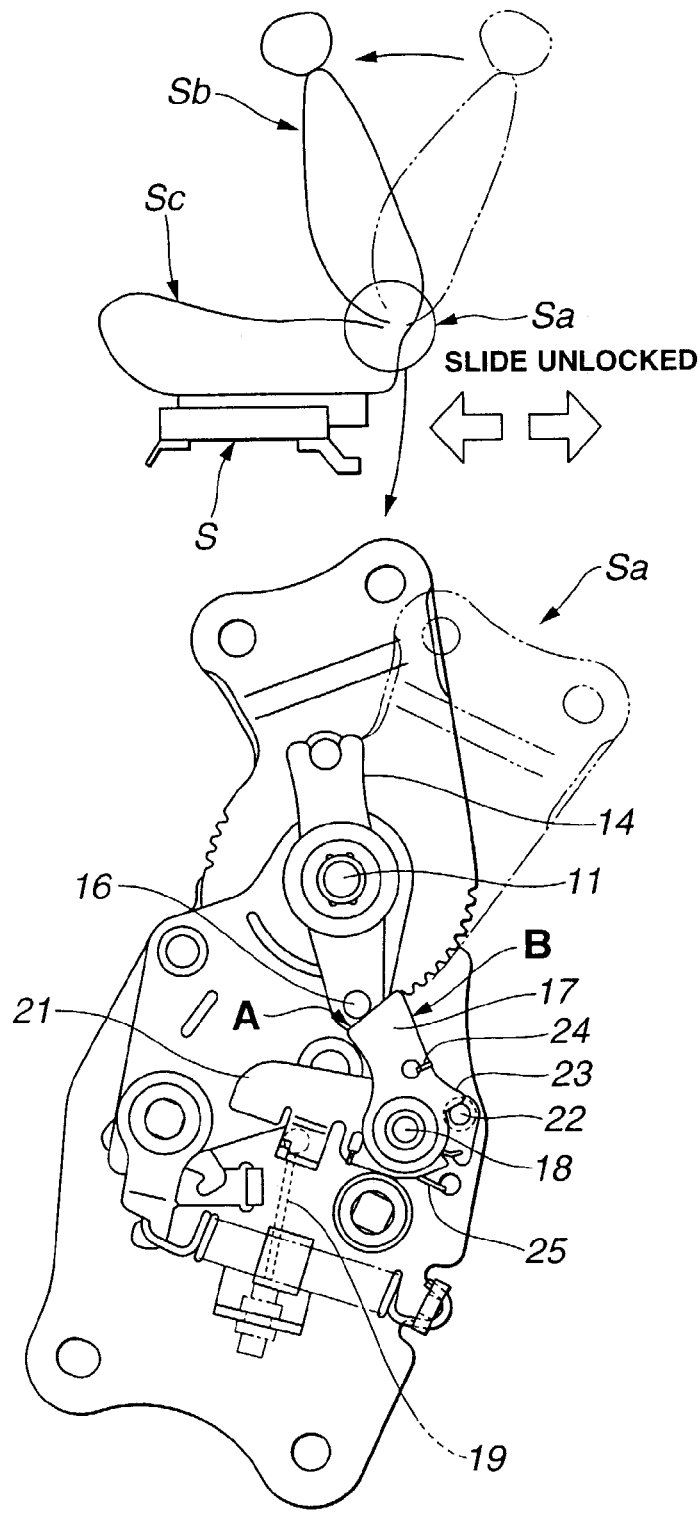
FIG. 8 is a schematic view of the left side of the vehicle seat showing a temporary stop position of the walk-in operation of the seat reclining apparatus and an enlarged portion view thereof.

Since nub portion 23 of first lever 17 is in contact with stopper pin 22 of second lever 21, second lever 21 must also rotate integrally with first lever 17 when pin 16 pushes and rotates first lever 17 by a predetermined angle clockwise according to FIG. 8, and both are rotated clockwise backward according to FIG. 8 against the force of second spring 25. Then, as first lever 17 and second lever 21 rotate to a predetermined forward inclination of approximately 45° under rotational contact of pin 16 against surface A, wire 19 is pulled as shown in FIG. 8, and the state of seat lock of seat-slide apparatus S is released. Thus, the seat is pushed forward in the vehicle by force of the spring which constantly urges upper rails 52 and 53 of seat-slide apparatus S frontward in the vehicle.

Figure 5:
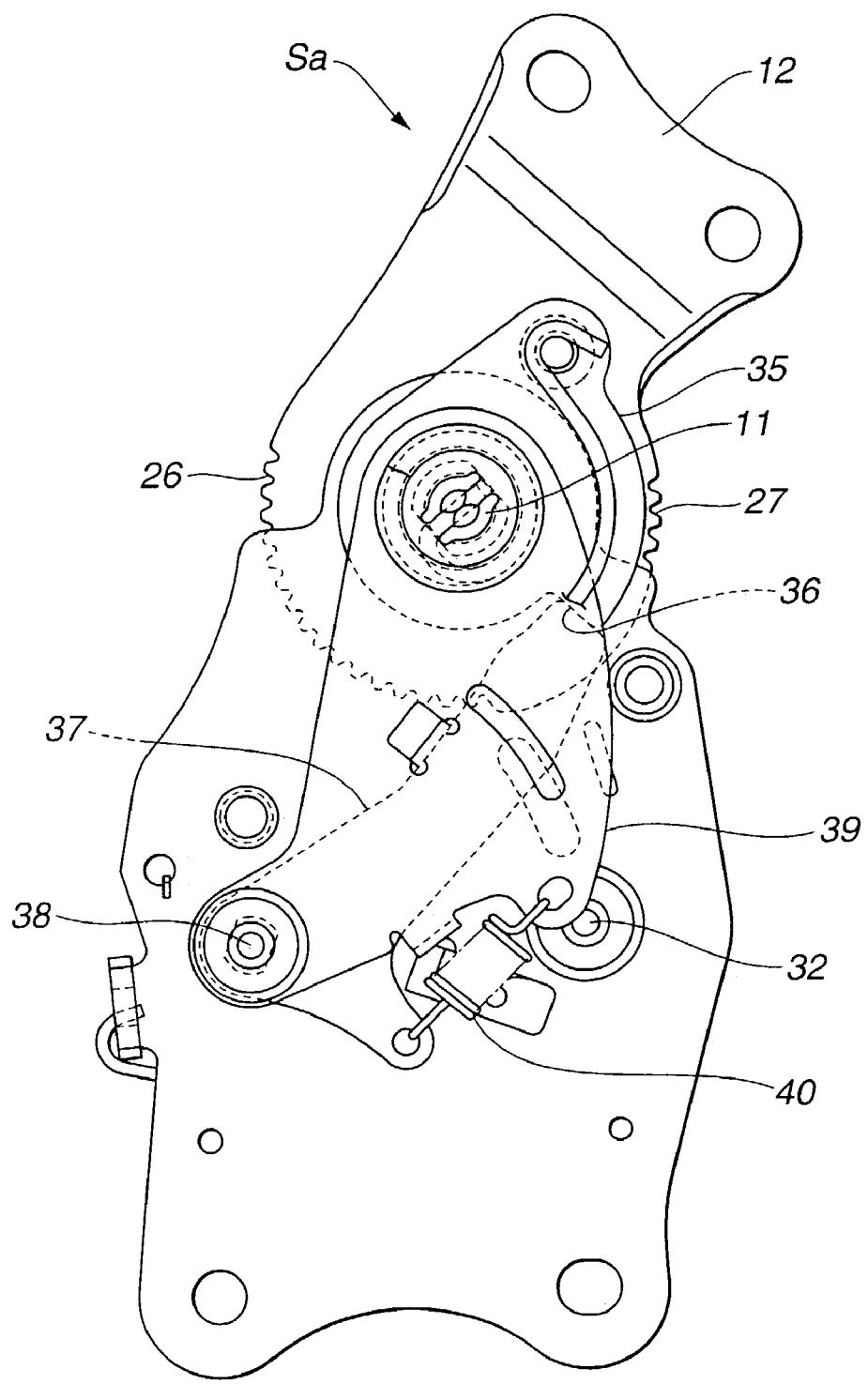
FIG. 5 is a back view showing an operation of the seat reclining apparatus in FIG. 2.

Now referring to FIG. 5, when seat back Sb folds forward to a predetermined forward inclination angle, stopper disk 35 has also rotated integrally with arm plate 12 clockwise according to FIG. 5 about center shaft 11, until an end of stopper lever 37 has contacted with stopper portion 36. Further rotation of stopper disk 35 and arm plate 12 integral therewith is thereby prevented, and folding forward of seat back Sb and therefore armplate 12 is maintained at this position. In this way stopper disk 35 and stopper lever 37 are used as an enter-exit stop position mechanism to limit forward inclination of arm plate 12 toward base plate 10 beyond this predetermined angle or position.

As pin 16 of walk-in plate 14 is being maintained in a state of contact with surface A of first lever 17 as shown in FIG. 8, second lever 21 is maintained in a state of being rotated clockwise according to FIG. 8 against the spring force of second spring 25. Therefore, a state of wire 19 being pulled, as well as a state of seat lock of seat-slide apparatus S being released, are maintained.

The seat according to the first embodiment can be used stably as a table in a state of seat lock after it has been moved forward in the vehicle. By rotating shaft 38 by means of a table lever or knob to rotate stopper lever 37 clockwise according to FIG. 5, the upper end thereof is caused to come away from stopper portion 36, allowing arm plate 12 and thus seat back Sb to be rotatable to a greater angle range, i.e., a range comprised of angles which are greater relative to seat back Sb before being folded forward than angles comprising the previously discussed angle range, this greater angle range including an angle at which seat back Sb is in a substantially horizontal state.

Figure 9:
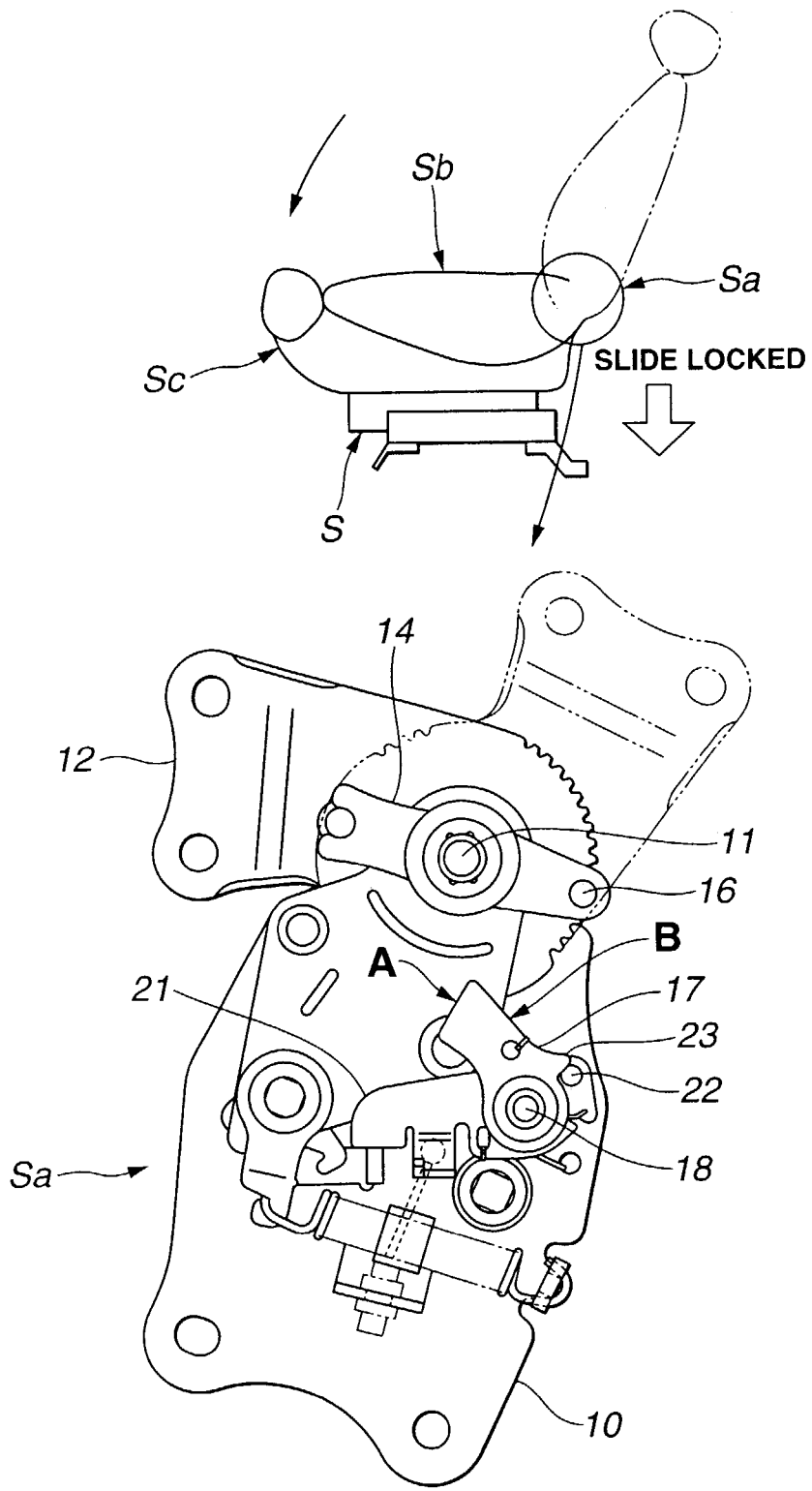
FIG. 9 is a schematic view of the left side of the vehicle seat functioning as a table, showing the seat reclining apparatus and an enlarged portion view thereof.

Pin 16 of walk-in plate 14 comes away from surface A of first lever 17 and out of contact with first lever 17 as shown in FIG. 9, and second lever 21 rotates counter-clockwise about shaft 18 by the force of second spring 25 and returns to an original position of being rotated forward relative to the vehicle, and at the same time, first lever 17 returns to an original position by stopper pin 22 of second lever 21 pushing nub portion 23 of first lever 17. Therefore wire 19 returns to an original state by the spring force of lock mechanism portions 54 and 54 of seat-slide apparatus S and a state of seat lock is entered, i.e., the seat is immovably fixed in place.

At the same time, since tooth portion 28 of tooth member 29 had already been situated at the toothless portion existing between first tooth portion 26 and second tooth portion 27, tooth portion 28 of tooth member 29 engages with second tooth portion 27 of arm plate 12 once arm plate 12 rotates to a substantially horizontal state, and thus, as shown in FIG. 9, seat back Sb is locked in a state of lying on top of seat cushion Sc in a substantially horizontal state.

When wishing to return seat back Sb to an upright position suitable for sitting after having been used as a table, the following operation can be performed with reference to FIG. 1. After operating the reclining lever or knob to unlock the engagement between tooth portion 28 of tooth member 29 and second tooth portion 27 and then raising seat back Sb from a horizontal state as a table, first tooth portion 26 moves to a position to be engageable with tooth portion 28 of tooth member 29, and although the upper end of stopper lever 37 is in contact with the arc portion of stopper disk 35, it is possible to raise seat back Sb without the upper end of stopper lever 37 engaging stopper surface 36.

Figure 10:
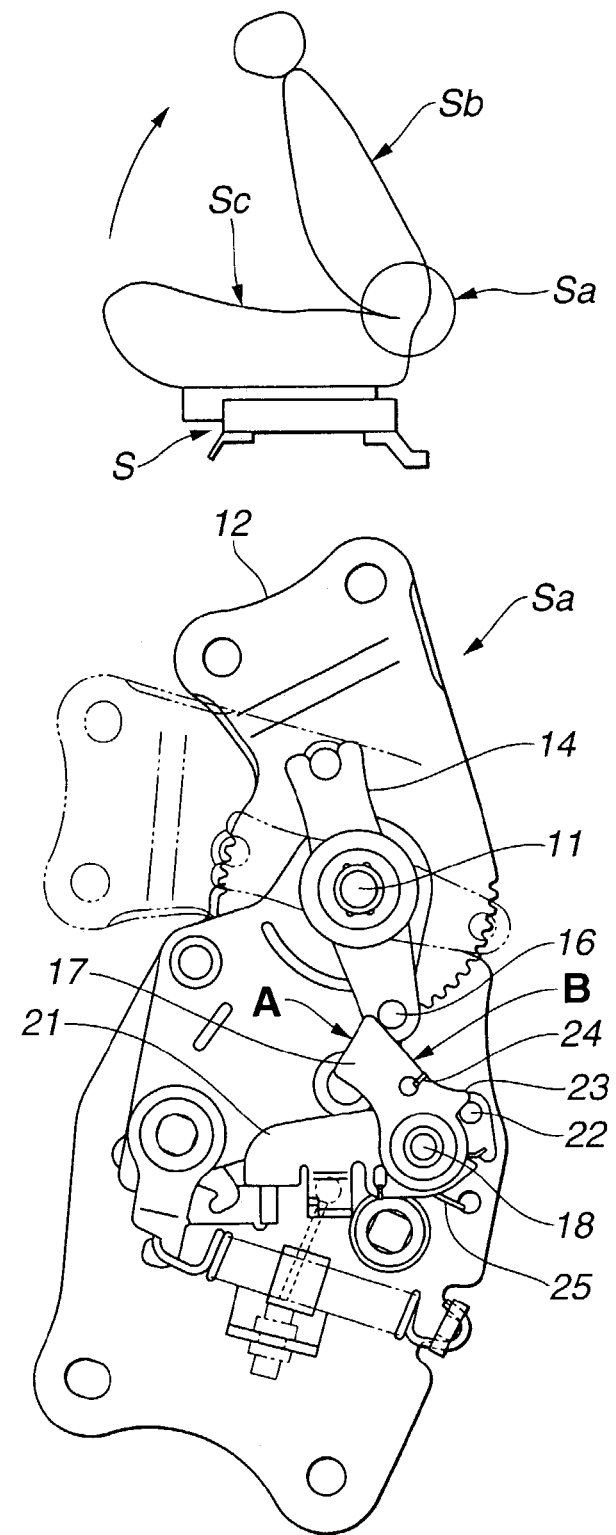
FIG. 10 is a schematic view of the left side of the vehicle seat showing the seat reclining apparatus during operation of raising the seat back after use as a table and an enlarged portion view thereof.
Figure 11:
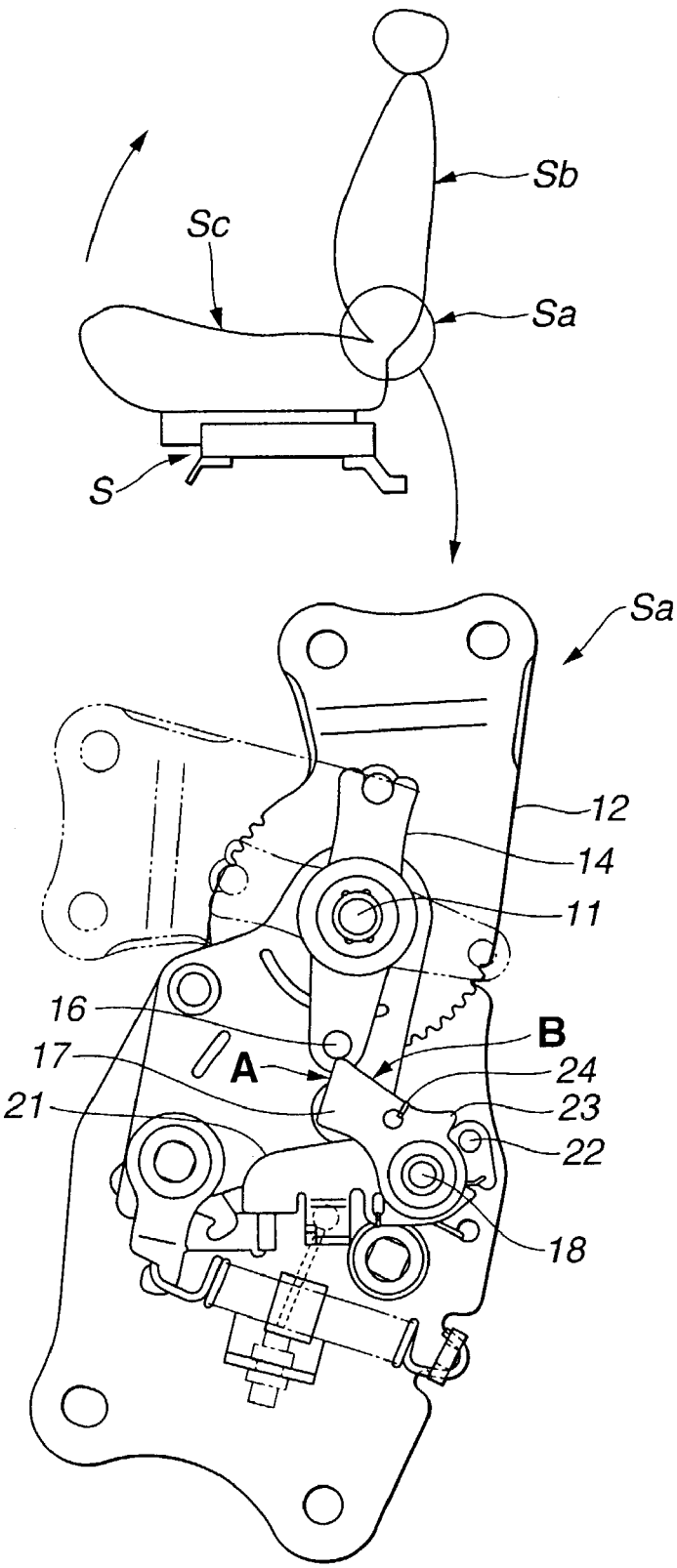
FIG. 11 is a schematic view of the left side of the vehicle seat showing the seat reclining apparatus during operation of raising the seat back after use as a table and an enlarged portion view thereof.

At the same time, as shown in FIG. 10, pin 16 of walk-in plate 14 contacts with surface B of first lever 17, then, as shown in FIG. 11, accompanying rotation of arm plate 12, pin 16 moves in an arc and first lever 17 is rotated counter-clockwise according to FIG. 11 about shaft 18 against the force of first spring 24 separately and individually from second lever 21 which remains stationary, and nub portion 23 comes away from stopper pin 22. Pin 16 continues to move toward the boundary between surfaces A and B, and this motion continues until pin 16 completely clears surface B. Once pin 16 has passed surface B, contact is discontinued between pin 16 and first lever 17. Accordingly, first lever 17 returns to an original state by the force of first spring 24 where nub portion 23 is once again in contact with stopper pin 22, as shown in FIG. 6.

A second embodiment will now be explained with reference to FIG. 13. A reclining apparatus in the second embodiment is called a round-type seat recliner, as can be known from Japanese patent No. 2,645,583. In this type of seat reclining apparatus, disks or plates are fixed to a seat cushion and a seat back respectively, designed so that their faces are in mutual contact and that one of which is rotatable. A lock tooth portion is formed on an inner circumferential surface of the rotatable disk, and a lock gear having a tooth portion is located inside of the fixed disk. The lock gear engages and disengages with the lock tooth portion through action of a cam with which the lock gear is in sliding contact, the cam being urged by a spring. The cam has an operating axle in a center thereof and by rotating the operating axle, it is possible to adjust the inclination angle of the seat back.

That is, a seat reclining apparatus of a round-type seat recliner according to the second embodiment of the present invention is joined to a seat-slide apparatus which is fixed to a vehicle floor and movable backward and forward relative to the vehicle as well as being fixable. As shown in FIG. 13, the seat reclining apparatus comprises a base plate 10*a* which is fixed to a seat cushion and an arm plate 12*a* which is fixed to a seat back. A mount member 60 is supported on base plate 10*a*, and a cover member 61 is supported on arm plate 12*a*, mount member 60 and cover member 61 engaging to be rotatable relative to one another. At least one lock gear is internally mounted, which is movable reciprocally in the radial direction to engage and disengage with at least one of a plurality of lock tooth portions formed on an inner circumferential surface of cover member 61, via a pair of left and right sliding guide portions disposed on an inner surface of mount member 60. By rotating an operating shaft 62 disposed at the center of both mount member 60 and cover member 61, one or more lock gears engage or disengage with at least one lock tooth portion of cover member 61, and in this way it is possible to freely adjust the inclination angle of the seat back.

Figure 13:
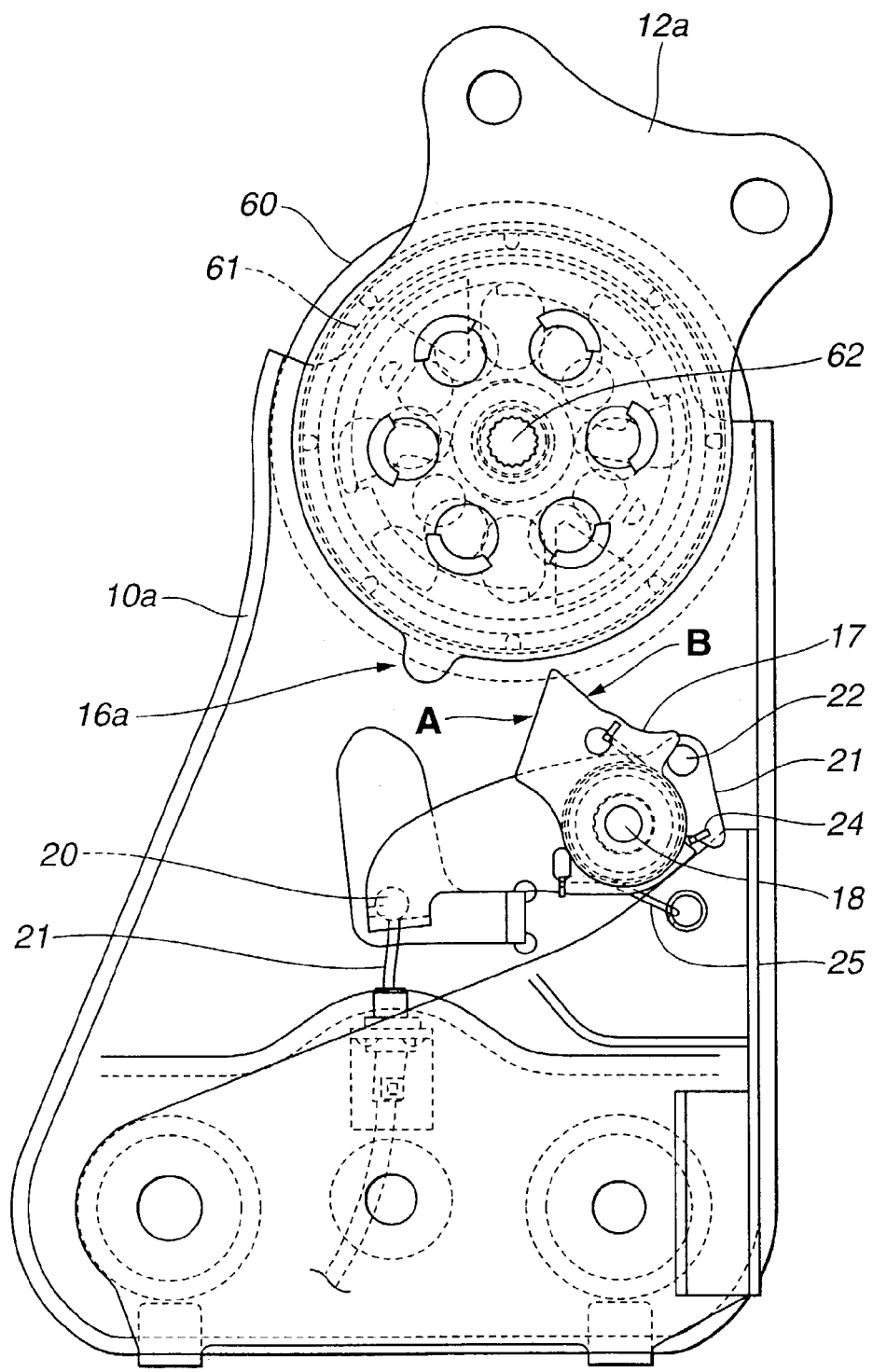
FIG. 13 is a front view showing a second embodiment according to the present invention.
Figure 14:
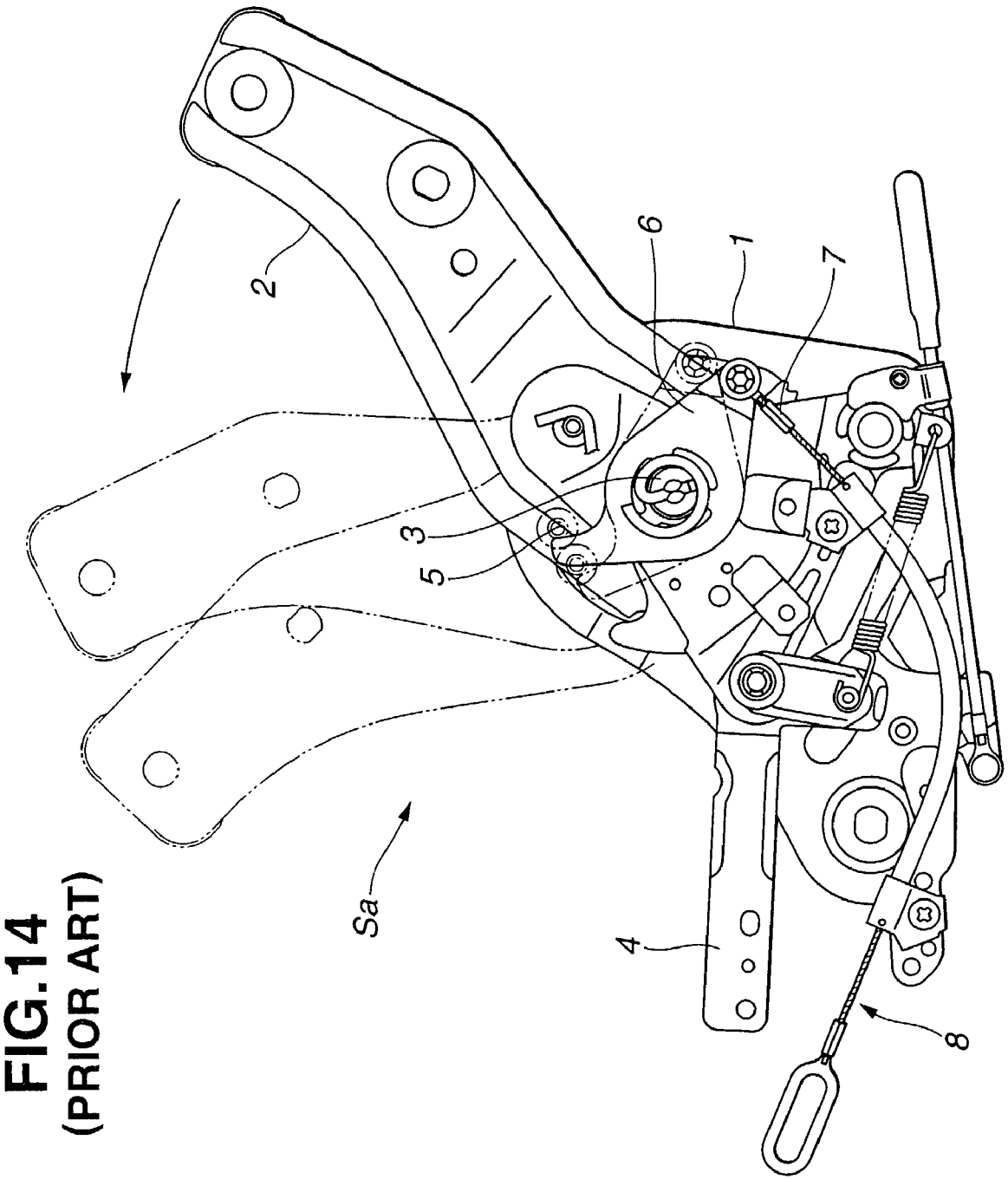
FIG. 14 is a front view showing a seat reclining apparatus according to the prior art.

Elements of the second embodiment in FIG. 13 which are the same as elements of the first embodiment explained in FIG. 1 use the same reference numerals to avoid repeated explanation. The only element in the second embodiment differing from the first embodiment is an arm plate 12*a* which also functions as walk-in plate 14 and comprises a projection portion 16*a*. Projection portion 16*a* acting as an engaging projection portion fulfills the same function as pin 16 of walk-in plate 14 of the first embodiment, by contacting surfaces A and B of first lever 17.

Further, stopper lever 37 of FIG. 2, which is for maintaining a predetermined forward inclination angle of seat back Sb, is disposed on another reclining apparatus in this embodiment, of which there are individual left and right symmetrical structures. That is, supposing the reclining apparatus structure of FIG. 13 to be the outer reclining apparatus of the pair, stopper lever 37 is disposed on the inner reclining apparatus. Further, an outer circumferential surface of arm plate 12*a* of the inner reclining apparatus is formed into an arc portion, and comprises a stopper surface thereon in the same manner as stopper surface 36 on the arc portion of stopper disk 35. Therefore, the features of the second embodiment are the same as those of the first embodiment, supposing the reclining apparatus structure of FIG. 1 to be the outer side and the reclining apparatus structure of FIG. 2 to be the reclining apparatus of the inner side.

With the embodiments according to the present invention, a state of seat lock between seat reclining apparatus Sa and seat-slide apparatus S is released by folding seat back Sb so that seat back Sb is inclined within a predetermined range of forward inclination angles either for entering and exiting the third seat or for use as a table, whereby the seat becomes movable forward in the vehicle. By folding seat back Sb even further to a substantially horizontal state for use as a table, the state of seat lock between seat-slide apparatus S and seat reclining apparatus Sa is once again entered, to achieve a sure stability with the second seat.

Since the walk-in plate 14, first lever 17 and second lever 21 are designed to function as separate elements, it is possible to raise seat back Sb of the seat from a state as a table with only first lever 17 needing to pivot.

Further, it is possible to change the installation of stopper lever 37, used for maintaining seat back Sb at a predetermined inclination, from an outer side of the seat to an inner side if it is felt to be more convenient.

Since seat back Sb stops at a predetermined inclination angle for entering or exiting the third seat as a vehicle enter-exit stop position without rotating to a forwardmost position, it is possible to put one's hand on inclined seat back Sb as a support to enter or exit the third seat. Also, since seat back Sb is not locked, returning seat back Sb is simplified. Therefore, entering and exiting is improved.

Further, since the walk-in mechanism and the enter-exit stop position mechanism can be set on either outer or inner seat reclining apparatus of a vehicle seat, they can be easily set without affecting vehicle seat structure or other layout conditions.

Therefore, the present invention is usable when a passenger enters or exits the third seat of the vehicle, or when wishing to use the second seat as a table.

This application is based on a prior Japanese Patent Application No. 2002-222765. The entire contents of a Japanese Patent Application No. 2002-222765 with a filing date of Jul. 31, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle seat having a folding mechanism, the vehicle seat being both fixable and slidable forward and backward relative to the vehicle, the vehicle seat comprising:

locking means for allowing or preventing seat sliding when unlocked or locked respectively;

a wire joined to the locking means at one end thereof, the wire unlocking or locking the locking means when pulled or at rest respectively;

a base member disposed above the locking means;

a first actuating member, supported to be rotatable in a first direction and a second direction on the base member;

a second actuating member, rotatably supported on the base member coaxially with the first actuating member and joined to another end of the wire, the second actuating member allowing the wire to be at rest when in a first position and pulling the wire when rotated by the first actuating member to be in a second position when the first actuating member is rotated in the second direction;

first urging means for urging the first actuating member in the second direction, disposed between the first actuating member and the second actuating member;

second urging means for urging the second actuating member in the first direction, disposed between the base member and the second actuating member;

an upper member rotatably supported on the base member; and an engaging projection member rotating integrally with the upper member, the engaging projection member contactable with the first actuating member to rotate the first actuating member in the first direction or the second direction.

2. The vehicle seat having a folding mechanism as claimed in claim 1, wherein the engaging projection member describes a rotation arc when the upper member rotates on the base member, the first actuating member lying within the rotation arc, the first actuating member being rotated as a single body with the second actuating member when the engaging projection member rotates to push the first actuating member in the second direction, the first actuating member being rotated individually when the engaging projection member rotates to push the first actuating member in the first direction.

3. The vehicle seat having a folding mechanism as claimed in claim 1, wherein the engaging projection member describes a rotation arc when the upper member rotates on the base member, the first actuating member comprising a pair of surfaces which lie within the rotation arc, the first actuating member being rotated in the first direction when the engaging projection member rotates to push on one of the surfaces and rotated in the second direction when the engaging projection member rotates to push on the other surface.

4. The vehicle seat having a folding mechanism as claimed in claim 1, wherein the second actuating member comprises a stopper portion abut table against the first actuating member, the first actuating member being urged to abut against the stopper portion by the first urging means, the second actuating member being rotated by the first actuating member to be in the second position when the first actuating member is rotated in the second direction.

5. The vehicle seat having a folding mechanism as claimed in claim 4, wherein the first actuating member comprises a projection portion which abuts against the stopper portion of the second actuating member.

6. The vehicle seat having a folding mechanism as claimed in claim 1, further comprising maintaining means for maintaining the first actuating member rotated in the second direction by the engaging projection member, by maintaining the upper member at a predetermined angle position relative to the base member.

7. The vehicle seat having a folding mechanism as claimed in claim 6, wherein the engaging projection member contacts with the first actuating member and rotates the first actuating member in the second direction within a predetermined angle range which includes the predetermined angle position at which the upper member is maintained by the maintaining means, and the engaging projection member is out of contact with the first actuating member when the upper member is rotated to a substantially horizontal position.

8. The vehicle seat having a folding mechanism as claimed in claim 6, wherein the first actuating member and the second actuating member are disposed on one side of the base member, and the maintaining means is disposed on another side of the base member.

9. The vehicle seat having a folding mechanism as claimed in claim 6, further comprising one reclining apparatus on one side of the vehicle seat and another reclining apparatus on another side of the vehicle seat, the engaging projection member, the first actuating member, and the second actuating member being disposed on one reclining apparatus, the maintaining means being disposed on the other reclining apparatus.

10. The vehicle seat having a folding mechanism as claimed in claim 1, further comprising a stopper disk rotating coaxially and integrally with the upper member, and disk stop means for stopping rotation of the stopper disk, the upper member being maintained at a predetermined angle position relative to the base member and the engaging projection member maintaining the first actuating member rotated in the second direction when the disk stop means engages the stopper disk.

11. The vehicle seat having a folding mechanism as claimed in claim 10, wherein the disk stop means comprises a stopper lever which is axially supported to be rotatable on the base member, the stopper lever existing in one of a position where engagement is possible or a position where engagement is not possible with the stopper disk, the stopper lever being urged to be in the position where engagement is possible with the stopper disk.

12. The vehicle seat having a folding mechanism as claimed in claim 1, wherein the engaging projection member is axially supported on the base member coaxially with the upper member.

13. The vehicle seat having a folding mechanism as claimed in claim 12, wherein the engaging projection member comprises a pin member contacting with the first actuating member when the engaging projection member is rotated to push on the first actuating member.

14. The vehicle seat having a folding mechanism as claimed in claim 1, wherein the engaging projection member is formed integrally with the upper member.

15. A vehicle seat having a folding mechanism, the vehicle seat being both fixable and slidable forward and backward relative to the vehicle, the vehicle seat comprising:

locking means for allowing or preventing seat sliding when unlocked or locked respectively;

a wire joined to the locking means at one end thereof, the wire unlocking or locking the locking means when pulled or at rest respectively;

a base member disposed above the locking means;

bottom actuating means for pulling the wire, rotatably supported on the base member and joined to another end of the wire, the bottom actuating means allowing the wire to be at rest when in a first position and pulling the wire when in a second position;

top actuating means for rotating the bottom actuating means from the first position to the second position, rotatably supported on the base member coaxially with the bottom actuating means;

an upper member rotatably supported on the base member; and an engaging projection member rotating integrally with the upper member, the engaging projection member being in one of a first area, a second area, a third area, and a fourth area, in the first area, the engaging projection member not contacting the top actuating means and the upper member being in a backward folding direction where it is possible to rotate the top actuating means in a second direction when the upper member is rotated in a forward folding direction, in the second area, the engaging projection member pushing and rotating the top actuating means in the second direction and thereby causing the bottom actuating means to be in the second position, in the third area, the engaging projection member not contacting the top actuating means and the upper member being in a forward folding direction where it is possible to rotate the top actuating means in a first direction when the upper member is rotated in a backward folding direction, in the fourth area, the engaging projection member pushing and rotating the top actuating means in the first direction.

16. The vehicle seat having a folding mechanism as claimed in claim 15, wherein the bottom actuating means comprises a stopper portion, the bottom actuating means being integrally rotated in the second direction when the top actuating means rotates in the second direction against the stopper portion.

17. The vehicle seat having a folding mechanism as claimed in claim 15, further comprising urging means for urging the top actuating means to rotate in the second direction to rest on the stopper portion and for urging the bottom actuating means to be rotated in the first direction.

18. The vehicle seat having a folding mechanism as claimed in claim 15, further comprising a stopper disk rotating coaxially and integrally with the upper member, and a stopper lever which is engageable with the stopper disk, forward inclination of the stopper disk being stopped by engagement of the stopper lever therewith at a position to maintain the engaging projection member in the second area.

19. The vehicle seat having a folding mechanism as claimed in claim 18, wherein the engaging projection member, the bottom actuating means, and the top actuating means are on an outer side of the base member, and the stopper disk and stopper lever are on one of an outer side or inner side of the base member.

\* \* \* \* \*